May 10, 1955    E. B. CLARK    2,708,122
COMBINED ELECTRICAL OUTLET BOX AND ARMORED CABLE
CLAMP FOR PLURAL MULTI-DIRECTIONAL CABLES
Filed Dec. 28, 1951
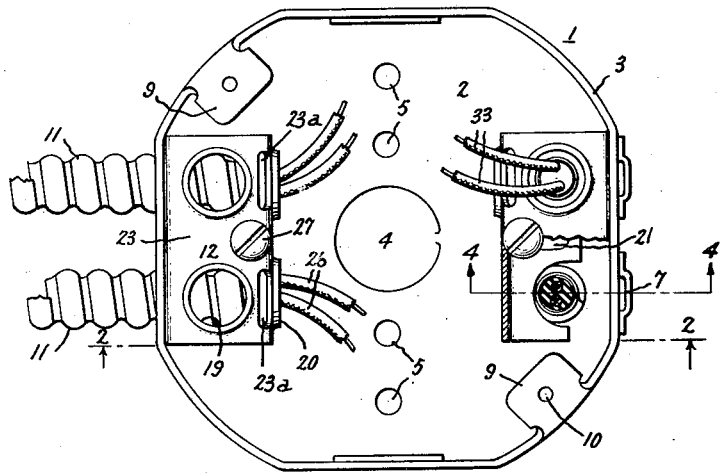
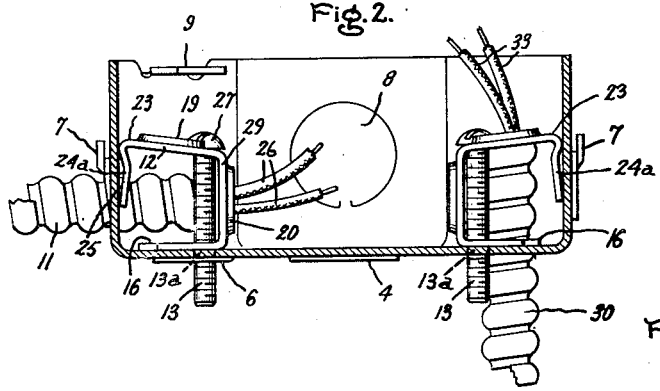
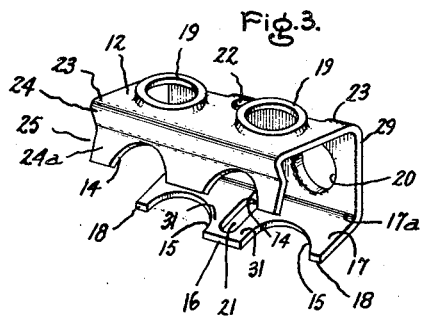
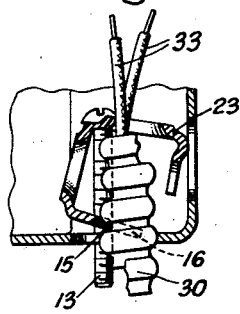
Inventor:
Edward B. Clark,
by
His Attorney.

United States Patent Office 2,708,122
Patented May 10, 1955

2,708,122

COMBINED ELECTRICAL OUTLET BOX AND ARMORED CABLE CLAMP FOR PLURAL MULTI-DIRECTIONAL CABLES

Edward B. Clark, Milford, Conn., assignor to General Electric Company, a corporation of New York Application December 28, 1951, Serial No. 263,767

3 Claims. (Cl. 285—24.5)

This invention relates to clamps and in particular to an improved clamp for securing armored cable within an electrical box.

Armored cable conventionally is passed through pry-out covered apertures in electrical boxes and secured to the box to prevent the cable from being pulled loose. A further reason for securing armored cable to an electrical box is to provide adequate conductor paths for grounding the outlet box and accordingly a good electrical connection is required between an armored cable and the box.

Cable conventionally is brought into an electrical box from either the side or bottom and it is desirable to have a single clamp for locking either side or bottom entrance cable. This objective has been accomplished in the past by tapping a hole through a corner of the box to receive a screw having its axis lying in a plane dividing the bottom and side of the box. This corner formed hole increases the cost of fabrication of the box. Ideally it would be advantageous to punch the clamp securing hole in the bottom of the box at the same time the other holes, knock-outs and pry-outs are being punched in the bottom. Also, the clamp securing holes should be in the bottom of the box to permit the threading of all holes in one operation, including the ear cover securing holes.

It is an object of this invention, therefore, to provide an improved cable clamp adapted to lock either side or bottom entrance cable.

It is a further object of this invention to provide an improved cable clamp adapted to hold either side or bottom entrance cable and which is held in the box by means of a single screw passing directly into the bottom of the box.

It is a further object of this invention to provide an improved cable clamp having adequate room within it for accommodating the armored portion of a cable.

Further objects and advantages of this invention will become apparent and the invention will be more clearly understood from the following description referring to the accompanying drawing and the features of novelty which characterize this invention will be pointed out with particularity in the claims annexed to and forming a part of this specification.

In the drawing, Fig. 1 is a top elevation of an outlet box having armored cable brought into the box through both its side and its bottom; Fig. 2 is a side elevation, partly in section, taken along the plane 2—2 of Fig. 1; Fig. 3 is a perspective view of my improved cable clamp; while Fig. 4 is a fragmentary view taken on the line 4—4 of Fig. 1 and showing how the clamp must be pivoted to one side to allow the insertion of the cable into the back of the box.

Briefly this invention comprises a wrapped cable clamp shaped substantially like an open-ended box. The clamp has slots for wedging either bottom or side entrance cable against an electrical box. The clamp is held in place by a screw passing directly through it into the bottom of the box.

In the drawing, an outlet box 1 is shown having a bottom 2 and wrapped-around sides 3 of somewhat octagonal shape. The bottom of the box is provided with a knock-out hole 4 and nail holes 5 for mounting the box. The bottom of the box is further provided with pry-out covered apertures 6 for permitting the entrance of armored cable into the box.

The sides of the box have pry-outs 7 and knock-outs 8 while ears 9 have threaded bores 10 therein for holding a cover (not shown) on the box by means of screws.

In the installation of cable in the box, one of the pry-outs, for example one of the side pry-outs 7, is removed from the box and an armored cable 11 is passed through the side 3 in the box and it is to be held there by a cable clamp 12 and a screw 13.

The cable clamp 12 is formed from sheet material and is punched while flat to provide semi-circular openings 14 in the edge of front wall 25 for engaging side entrance cable and semi-circular openings 15 in the edge of bottom wall 17 for engaging bottom entrance cable. It is to be noted that the semi-circular openings 15 are separated by a tongue 16 which extends a greater distance away from a corner bend 17a than does either of the outer legs 18 of the semi-circular openings 15. The purpose of elongated leg 16 is to provide a sliding support for the clamp which will not lock in the pry-out holes 6 when clamping bottom entrance cable.

The clamp 12 is also provided with conductor openings 19 in its top wall 23 for admitting the conductors of bottom entrance cable and conductor openings 20 in its back wall 29 for admitting the conductors of side entrance cable. Each of the conductor openings is formed in such a manner that a smooth curved surface is provided for contact that will not abrade and cut through the insulation of electrical conductors.

Clamp 12 is also supplied with an elongated slot 21 in its bottom wall 17 and a clearance hole 22 in its top wall 23 for screw 13. Slots 23a are furnished in top or upper wall 23 to weaken the structure to facilitate the bending of the top wall 23 down into engagement with the cable to be clamped and also provide visibility apertures for examining the end of the cable.

After the flat stock strip used in fabricating the clamp 12 has been punched as described, the strip is then formed into an open box-like structure having only three corners with the upper side wall engaging corner 24 being offset or deformed to deflect the outer face 24a slightly away from the side 3 of the outlet box. This is done to provide a smooth sliding edge or surface 24 in engagement with the side of the outlet box and to assure better alignment between the wall 25 and side entrance cable; e. g., cable 11 of Fig. 2.

In the installation of this cable clamp, screw 13 is passed through aperture 22 and through slot 21 into a threaded bore 13a in the bottom of the outlet box. Then when an electrician wants to clamp a cable, one of the pry-outs, for example the pry-out 7, is removed from the box and the cable 11 is passed through the pry-out hole 6 into the clamp 12. It is noted that the cable 11 is stripped at its outer ends to remove portions of the armor and to expose the conductors 26 which are passed through the conductor opening 20. This structure is such that the armor of cable 11 is stopped by the inner surface of conductor hole 20 which does not have a diameter large enough to permit the cable armor to pass therethrough.

The cable clamp is then brought down so that the semi-circular opening 14 comes into contact with the outer peripheral surface of the armor of cable 11 at a point immediately adjacent the inner face or surface of side 3 of the outlet box. It is to be noted that if the screw 13 had been tightened down, it would have to be relieved enough to lift the clamp so that the cable could be brought into the box. Then the screw 13 is tightened into the threaded bore 13a and the upper wall 23 of the cable clamp is forced down by the action of head 27 of screw 13 so that the clamp corner 24 slides along the inner surface of wall 3 of the outlet box. This process is continued until the semi-circular openings 14 wedge the cable against the bottom of the pry-out openings 6 through which the cable is brought into the box.

One of the particular features of this invention is that the screw clearance hole 22 is immediately adjacent the inner surface of back wall 29 of the clamp so that the head 27 of screw 13 overlies the whole wall 29 and consequently would have to compress the whole wall 29 in order to collapse the clamp. Also since bottom wall 17 rests against the bottom wall of the box and the back wall 29 and screw 13 are vertical with respect to it, turning down on the screw forces bottom wall 17 against the box bottom and thus holds the cable clamp from sliding along the bottom of the box inwardly toward the center of the box. This gives great strength to the clamps.

It is to be noted that when the bottom wall 17 of the clamp is seated on the back wall of the box with the screw 13 threaded into the aperture 13a, it is not possible to insert the end of a length of armored cable 30 into the pry-out 6 which is located in the back wall of the box. This is true because when the bottom wall 17 rests flush against the bottom wall of the box, a portion of the pry-out 6 is covered by the wall 17. It is necessary to move the clamp away from the bottom wall of the box and tilt it clockwise as is shown in Fig. 4 so that the bottom wall 17 rests on the free end of the tongue 16 to uncover the pry-out 6. With the clamp in this position, the cable 30 may then be inserted through the back wall of the box with the conductors 33 extending through the openings 19. As is clearly seen in Fig. 4, when the screw 13 is tightened down the back wall 29 and bottom wall 17 slide for a short distance on the free end of tongue 16 while the walls 31 defining slot 21 pass along the sides of the screw transverse to its longitudinal axis until the entire clamp turns in a counter-clockwise direction and reaches the final clamping position to press the cable into contact with the side of the pry-out 6 as shown at the right-hand side of Fig. 2.

Modifications of this invention will occur to those skilled in the art and it is desired to be understood, therefore, that this invention is not intended to be limited to the particular embodiment disclosed but rather it is intended to cover all modifications which are within the true spirit and scope of this invention.

What I claim as new and desire to secure by Letters Patent of the United States is:

1. The combination of an outlet box having a plurality of pry-outs in both its bottom wall and side walls and adjacent the junction thereof, of a cable clamp adapted to clamp cable selectively entering pry-out openings formed in either the bottom wall or side wall of the box, said clamp comprising a back wall, a top wall integral with the top edge of the back wall and extending at substantially a right angle from the back wall, a downwardly extending front wall substantially perpendicular to the outer edge of the top wall and having a free edge with concave portions in alignment with and adjacent to the pry-outs in the side wall of the box for clamping engagement with side-entering cables, and an inwardly turned bottom wall integral with the bottom edge of the back wall and extending at substantially a right angle thereto, and having an edge with concave portions in alignment with pry-outs in the bottom wall of the box for clamping engagement with the bottom-entering cables, said back and top walls of the clamp having conductor-receiving openings in alignment with the concave edge portions on the front and bottom walls of the clamp respectively, said top wall having a single screw opening directly adjacent the inner surface of said back wall, said bottom wall of the clamp having an elongated screw slot in alignment with said top wall screw opening and arranged substantially perpendicular to the back wall of the clamp, and said box bottom wall having a single tapped opening in line with said top wall screw opening and said elongated screw slot in the bottom wall of the clamp, and a screw which extends substantially perpendicular to the bottom wall of the box through said screw opening and screw slot and being threaded into said tapped opening with its head adjacent the top edge of said back wall, whereby the said front wall covers a substantial portion of the pry-out openings in the side wall of the box making it necessary to lift the clamp in order to insert a side-entering cable in the box, said screw when tightened down on the clamp acting through the top wall to force the front wall into clamping engagement with such side-entering cable, the bottom wall of said clamp being of substantially the same over-all dimensions as the top wall such that when the clamp is bolted in the box with its bottom wall seated on the bottom wall of the box, portions of the bottom wall overlie a substantial portion of the pry-out openings in the bottom wall of the box thereby preventing the insertion of a cable through the bottom of the box, the said clamp being tilted to uncover the pry-out openings and resting with the free edge of the bottom wall of the clamp seated between the said screw and the adjacent side wall of the box, whereby for bottom-entering cable, said screw as it is threaded into the bottom wall of the box acts to tilt the clamp in the reverse direction to force the bottom wall of the clamp into gripping engagement with such bottom-entering cable.

2. In a combination of an outlet box and a cable clamp as recited in claim 1 wherein the front wall and bottom wall of the clamp serve to close the remainder of the pry-out openings in either the side walls or bottom wall of the box respectively which are not closed by the cable inserted therethrough.

3. The combination of an outlet box having a plurality of pry-outs in both its bottom wall and side walls and adjacent the junction thereof, of a cable clamp adapted to clamp cable selectively entering pry-out openings formed in either the bottom wall or side wall of the box, said clamp comprising a back wall, a top wall integral with the top edge of the back wall and extending at an internal angle to the back wall greater than 90°, a downwardly extending front wall integral with the outer edge of the top wall and ararnged generally parallel with said back wall, and having a free edge with concave portions in alignment with and adjacent to the pry-outs in the side wall of the box for clamping engagement with side-entering cables, and an inwardly turned bottom wall integral with the bottom edge of the back wall and extending at substantially a right angle thereto, and having a free edge with concave portions in alignment with the pry-outs in the bottom wall of the box for clamping engagement with the bottom-entering cables, said concave portions being separated by an outwardly projecting tongue, said back and top walls of the clamp having conductor-receiving openings in alignment with the concave edge portion of the front and bottom walls of the clamp respectively, said top wall having a single screw opening directly adjacent the inner surface of said back wall, said bottom wall of the clamp having an elongated screw slot in alignment with said top wall screw opening and arranged substantially perpendicular to the back wall of the clamp, and said box bottom wall having a single tapped opening in line with said top wall screw opening and said elongated screw slot in the bottom wall of the clamp, and a screw which extends substantially perpendicular to the bottom wall of the box through said screw opening and screw slot and being threaded into said tapped opening with its head adjacent the top edge of said back wall, whereby the said front wall covers a substantial portion of the pry-out openings in the side wall of the box making it necessary to lift the clamp in order to insert a side-entering cable in the box, said screw when tightened down on the clamp acting through the top wall to force the front wall into clamping engagement with such side-entering cable, the bottom wall of said clamp being of substantially the same over-all dimensions as the top wall such that when the clamp is bolted in the box with its bottom wall seated on the bottom wall of the box, portions of the bottom wall overlie a substantial portion of the pry-out openings in the bottom wall of the box thereby preventing the insertion of a cable through the bottom of the box, the said clamp being tilted to uncover the pry-out openings and resting on the free end of the outwardly projecting tongue of the bottom wall of the clamp which is seated between the said screw and the adjacent side wall of the box, whereby for bottom-entering cable, said screw as it is threaded into the bottom wall of the box acts to tilt the clamp in the reverse direction to force the bottom wall of the clamp into gripping engagement with such bottom-entering cable.

References Cited in the file of this patent

UNITED STATES PATENTS

| | | |
|---|---|---|
| 1,778,624 | Carlson | Oct. 14, 1930 |
| 1,783,409 | Cook | Dec. 2, 1930 |
| 1,820,626 | Newman et al. | Aug. 25, 1931 |
| 2,480,522 | Tornblom | Aug. 30, 1949 |